Figure 1:
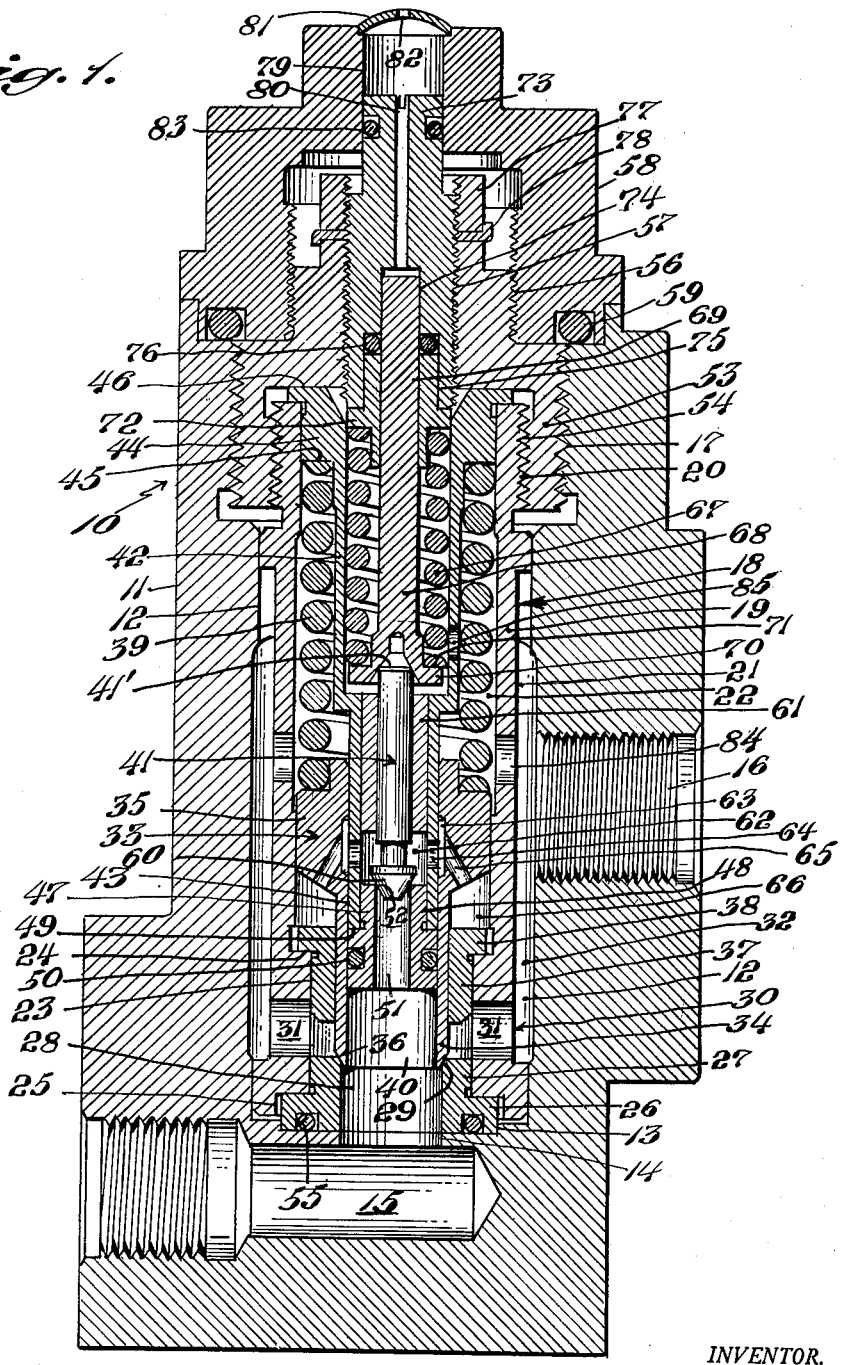

Aug. 21, 1956     F. C. LORNITZO     2,759,487
RELIEF VALVE

Filed April 23, 1952     2 Sheets-Sheet 1

INVENTOR.
Frank C. Lornitzo
BY
Barlow & Barlow
ATTORNEYS.

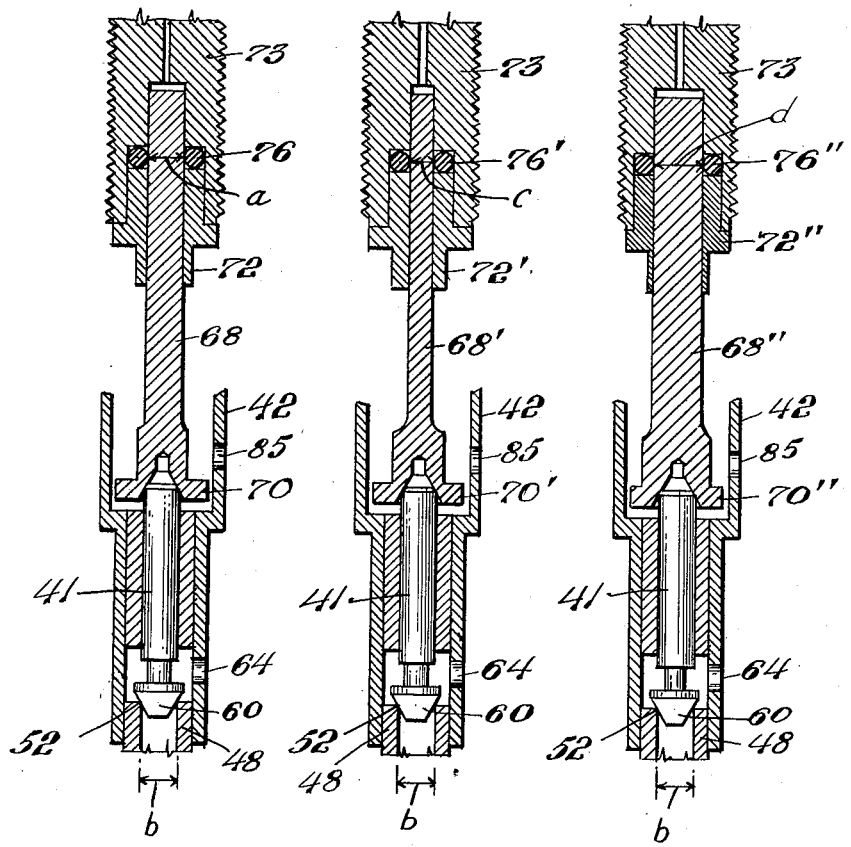

United States Patent Office 2,759,487
Patented Aug. 21, 1956

2,759,487

RELIEF VALVE

Frank C. Lornitzo, Pawtucket, R. I., assignor to Merit Engineering, Inc., a corporation of Rhode Island Application April 23, 1952, Serial No. 283,822

7 Claims. (Cl. 137—490)

This invention relates to a relief valve.

In certain hydraulic installation it is necessary to maintain relief pressure constant, and when back pressure does occur at the relief port or on the down stream side of the valve, it is usual to bleed this relief port pressure by means of a bleed line connected to the down stream conduit and to the reservoir of the system. This manner of controlling back or relief port pressure is often undesirable.

An object of this invention is to provide a relief valve so constructed as to control the effects of back pressure of the relief port reflected within the valve.

Another object of this invention is to provide a relief valve so constructed that it will maintain relief pressure constant by controlling the effects of back pressure at the relief port reflected within the valve.

To this end I provide a relief valve having a main pressure responsive by-pass valve, the opening of which is controlled by a pressure responsive poppet or pilot valve. I provide the pilot valve with oppositely disposed pressure areas to be subjected to relief port pressure. By varying the size of said pressure areas relative to each other, I may provide a balanced condition so as to neutralize the effect of the relief port pressure as reflected within the valve so as to maintain relief pressure constant, or I may choose such opposite pressure areas as to provide such control of relief pressure as may be desired within the range of the valve.

In the accompanying drawings:

Figure 1 is a longitudinal sectional view through a relief valve embodying my invention;

Figures 2, 3, and 4 are similar central sectional views of poppet valve parts and associated elements thereof shown in the valve of Figure 1 but having different opposite pressure area valves.

Referring to the drawing, the relief valve 10 comprises an envelope or body 11 having a longitudinal bore 12 extending inwardly from the upper end of the body to nearly the bottom thereof where it joins the reduced bore 13, from which extends the further reduced bore 14 providing a passage to an inlet or pressure port 15 formed by a lateral bore extending inwardly from one side of said body to intersect the bore 14. An outlet or return port 16 extends inwardly from one side of the body to open into said bore 12. A threaded bore 17 at the upper portion of the body joins the bore 12 and is larger than the bore 12.

In this bore 12 there is mounted a valve unit assembly indicated generally 18 which includes a tubular member or sleeve 19 externally threaded at the upper end portion as at 20 and having a reduced waist portion 21 intermediate its ends. This sleeve 18 extends within the bore 12 to nearly the upper edge of the recess 13. The bore 22 through the said sleeve is reduced at the lower end portion thereof as at 23 to form a stop shoulder 24, and the extreme inner end portion of said bore 22 is enlarged so as to form an inverted recess 25.

In the recess 25 formed in one end of the sleeve there is mounted a main valve seat member 26 which abuts against the radial wall of the recess 25 and has a reduced upper portion 27 which is received in the adjacent reduced bore portion 23 and is there frictionally held in position. The member 26 has a bore or opening 28 therethrough which is of a diameter equal to that of the reduced bore portion 14 and extends in continuation thereof. This bore 28 at the upper end of the member 26 forms a knife edge valve seat 29. A passage indicated generally 30 is formed by a plurality of radial openings 31 through the lower portion 21 and connects the opening 28 to an annular space 32 defined by the reduced portion 21 and the wall of the bore 12. Thus there is provided a conduit from the pressure port 15 through the openings 14, 28 into the space 32 and out through the return port 16.

A main valve plug indicated generally 33 controls the passage of fluid through the opening 28 and comprises a slidable tubular member having a skirt portion 34 and an enlarged head 35 which is of a diameter to be freely slidable within the bore 22. The free or lower edge of the skirt 34 is tapered as at 36 to engage and form a tight seal against the seat 29. The main valve plug 33 is additionally slidably guided by means of a sleeve 37 which is frictionally received in the upper part of the reduced bore portion 23 and is provided with a flange 38 which seats against the shoulder 24. The lower edge of this sleeve 37 is spaced a substantial distance from the upper edge of the valve member 26 as shown. A compression spring 39 bears against the upper side of the head 35, acting in a direction tending to move said main valve to the normal seated position as shown in the figure. The bore 40 through the main valve is for manufacturing reasons made slightly less in diameter than the opening 28 and presents an edge wall area extending into the opening 28 exposed to fluid pressure from the port 15 acting thereon in a direction tending to unseat said main valve 33 against the force of the spring 39. However, this edge wall area is maintained very small so that but a very little area is exposed to the pressure of this pressure port and may be readily compensated for by a choice of spring 39.

A pilot or poppet valve indicated generally 41 is provided for controlling the opening and closing of the said main valve 33. This valve 41 is mounted in a tubular housing 42 having a reduced skirt portion 43 and an enlarged head portion 44 at its upper end providing a shoulder 45 and is further enlarged at the extreme upper end portion thereof to form an annular flange 46. This housing 42 is received within the sleeve 19 with the head portion 44 thereof engaging the wall of the bore 22 and the flange 46 resting against the upper edge of the said sleeve 19. The skirt portion 43 extends a substantial distance within the opening 40 through the main valve, and the said main valve is freely slidable along said skirt portion 43. The upper end of the spring 39 abuts against the shoulder 45. A poppet valve seat member 47 having a diameter equal to the said skirt portion 43 is received in the opening 40 and has a reduced portion 48 to be received within the lower end portion of the bore of the skirt 43 and forms a stop shoulder 49 to engage against the adjacent edge of the said skirt 43. This seat member 43 is sealed against the walls of opening 40 by an O-ring packing 50.

The housing 42 is secured to the sleeve 19 by means of an assembly nut 53 which has a recess 54, the side wall of which is threaded to engage the threaded portion 20 of the sleeve 19 to clamp the flange 46 between the radial wall of the recess 54 and the upper edge of the said sleeve 19. The assembly nut 53 threadedly engages the threads 17 to force the lower end of the sleeve 19 into engagement with the member 26 to clamp said member 26 against the bottom of recess 13. Thus the assembly 18 is secured within the bore 12 and an O-ring packing 55 is received within an annular groove in the lower edge of member 26 to seal the assembly against leakage to pressure from port 15. The nut 53 is also provided with reduced threaded portion 56 and a central threaded opening 57 therethrough. A cap closure 58 threadedly engages the portion 56, and a packing 59 seals the upper portion of the valve assembly against leakage past the threads 17.

The poppet valve 41 has a conical end 60 which is adapted to engage the seat 52 to close the opening 51 and is slidably mounted within the skirt portion 43 as by means of a bushing 61 frictionally secured to the inner walls of the skirt 43 and extending inwardly therein in spaced relation to the member 47 so as to form a chamber 62 defined by the inner walls of the skirt 43 and the adjacent end edges of member and sleeve 47, 61. The conical end 60 is exposed through the opening 51 to fluid from the pressure port 15, which fluid on said valve 41 acts in a direction tending to move the same to open position.

The opening 40 through the main valve 33 along the head 35 is enlarged so as to provide an annular recess 63 surrounding the skirt 43. This recess 63 is connected to the chamber 62 by means of radial openings 64 and is connected by means of openings 65 to a chamber 66 defined by the walls of the bore 22, head 35, and the upper side of the member 37.

The poppet valve 41 is opposed to movement by pressure from port 15 by means of a compression spring 67, which through a spring guide member 68 exerts a predetermined force on said poppet valve tending to hold the same in the seated or closed position. This guide 68 has a stem portion 69 and an enlarged head 70 at its lower end which engages the upper edge 41' of the stem of the poppet valve 41 and provides a shoulder 71 against which the spring 67 abuts. An adjusting screw bushing 72 slidably engages the stem portion 69, and it provides an abutment against which the other end of the spring 67 engages. An adjustable screw 73 which is adjustably received in the bore 57 of the assembly nut 53 has a central bore 74 extending inwardly from the lower end thereof for receiving the stem 69 and is enlarged at the inner end portion as at 75 to receive the bushing 72. The stem 69 is sealed against leakage by a packing 76 positioned between the said stem and the wall of the recess 75. The spring 67 is adjusted by means of said screw 73 which is in turn held in the adjusted position by means of a lock nut 77 and a lock washer 78. The screw 73 has an upper reduced portion which is received in an opening 79 in the cap 58 and which opening 79 is open to the atmosphere. A vent 80 through the adjusting screw 73 to the top of the stem 69 opens into the opening 79 and thus to the atmosphere so as to provide for free movement of the said valve 41. The opening 79 is closed by a plug 81 having a vent 82 to the atmosphere. The reduced portion of the adjusting screw 73 is sealed against leakage by an O-ring packing 83.

It is desired that the moving parts of the valve assembly be reasonably free of friction. Consequently there will be a leakage of pressure from chamber 66 between the skirt 34 and guide 37 into bore 23 in the space therein between the member 26 and guide 37 to pass out therefrom through openings 31 in bore 12 and out to return port 16. There will also be a leakage from the chamber 66 between the enlarged head 35 and bore 22 to pass into the portion of the bore 22 above the said head 35, this portion of the bore being connected by means of radial openings 84 to the space 32. There will also be a leakage of pressure from chamber 62 past the stem 41 into the upper portion of the poppet valve housing 42, which portion of the housing 42 is connected by radial openings 85 to the bore 22. As a consequence, the poppet valve 41 will, when in the closed or seat position, be subjected to return port pressure. That is, there will be a leakage of return port pressure past the inner and outer walls of the enlarged head 35 into chamber 62. There will also be a leakage from return port 16 by the stem 41 into chamber 62.

In the operation of the valve the spring 67 is adjusted to permit the valve plug 33 to open at a predetermined pressure. This spring controls poppet valve 41. Upon said poppet valve being subjected to said predetermined pressure, as by way of example 1,000 pounds, the spring 67 will yield, and the valve 41 will be unseated, and fluid from pressure port 15 will flow into chamber 62. The head 35 which forms the upper wall of chamber 62 affording a pressure area on the main valve 33 at port 15 pressure transmitted to said chamber 62 to act on said head 35 in a direction to unseat said valve 33 so as to pass liquid from port 15 past valve seat 29 and through openings 31, space 32, and out therefrom to port 16. The opening of said valve 33 will be opposed by the pressure of spring 39 which is constant and which will collapse at the predetermined opening pressure of valve 33.

Upon a drop in pressure at the port 15 to a predetermined value, the urge of spring 67 will return the valve 41 to seated position and seal the chamber 66 to pressure from port 15 and also trap any liquid contained in this chamber 66, the pressure of which is holding the valve 33 in the open position. As previously pointed out, this trap liquid will leak out of chamber 66 and when a drop in the said pressure has occurred sufficient to be overcome by the spring 39, the valve 33 will move to seated position.

In accordance with one of the objects of the invention, the valve is arranged so that relief pressure will remain constant. To this end, the stem 41' of the poppet valve is made of a diameter to equal that of its valve seat 52 which provides for opposite equal pressure area located in chamber 62 subjected to return port pressure leaking into said chamber 62. Thus this portion of the valve 41 is balanced within said chamber 62 to any variation in return port pressure therein. The stem portion 69 of spring guide 68 at "a" (see Figure 2) at the location of seal or packing 76 is made of a diameter also equal to that of valve seat 52 which is equal to the stem 41' engaged by the guide 68, which provides an area at "a" equal to the area "b" of valve seat 52. Therefore, the stem portion 41' and portions of guide 68 within the housing 42 are also balanced against return port pressure. The spring guide 68 is in effect an extension of the stem 41' but for manufacturing reasons is made in two parts. Thus the valve 41 is balanced and any return port pressure reflected within the valve assembly is neutralized, and relief pressure is maintained constant regardless of any back pressure which may occur in the downstream side of the valve.

In certain instances it may be desirable to utilize back pressure or return port pressure in a controlled manner. To this end the oppositely disposed pressure areas on the valve 41 and spring guide 68 may be readily chosen to accomplish the purpose desired. As by way of example, in Figure 3 the area "c" at the location of seal 76' is made smaller than the area "b" of valve seat 52. Thus back pressure reflected within the valve will have a force adding to spring 39 and tending to seat the valve 41. In Figure 4 the area "d" of guide 68" at the location of seal 76" is made larger. Thus back pressure reflected within the valve will have a lifting action on the valve 41 against the action of spring 39. Thus the back or return port pressure reflected within the valve may be utilized to provide a lifting force on the valve 41, or it may be utilized to provide an opposing force to the unseating of the valve 41.

I claim:

1. A relief valve having a relief port, a return port, a passage connecting said ports, a pressure responsive main valve in said passage for controlling the relief flow through said passage, a second passage connecting the relief port and the surface of the main valve on which pressure acts to open said main valve, a valve seat in said second passage, a pilot valve responsive to relief port pressure and positioned in said second passage for controlling the opening of said main valve and normally seated on said valve seat, a chamber separate of said passages and communicating with the return port, said pilot valve being exposed to return port pressure on the return port side of said seat and having a stem extending into said chamber and exposed to the return port pressure in said chamber, said stem including a plunger portion separate of the pilot valve and extending into engagement with said pilot valve, spring means acting on said plunger portion to bias and hold the same into engagement with the pilot valve and for applying a resilient bias on said pilot valve against the opening thereof, and a seal between said plunger and the walls of said chamber to block the return port pressure from acting on the free end extremity of said plunger, whereby the return port pressure will act on said pilot valve on the portion thereof extending only between said seat and the location of the said seal on the plunger.

2. In a valve as set forth in claim 1 in which the diameter of said plunger at the location of the seal is equal to the diameter of the said valve seat whereby said pilot valve on the return side of said seat is in balance to return port pressure.

3. In a relief valve having a relief port, a return port, and a chamber open to return port pressure, a pressure responsive main valve for controlling said relief port, a pilot valve responsive to relief port pressure and positioned in a passage connecting said relief port and the surface of the main valve on which pressure acts to open said main valve for controlling the movement of said main valve, a valve seat in said passage for said pilot valve, said pilot valve being exposed to return port pressure on the return port side of said valve seat and having a stem extending through said chamber, a compression spring surrounding said stem and acting thereon in a direction to oppose unseating of said pilot valve, and sealing means between the walls of said chamber and the end of said stem to block return port pressure from said chamber from acting on the end of said stem whereby said pilot valve will be subjected to return port pressure only on said portion thereof extending between said valve seat and the location of said sealing on said stem, said stem being made in two parts, one of which has a shoulder thereon against which said spring abuts to hold said parts to each other.

4. In a relief valve having a relief port, a return port, and a chamber open to return port pressure, a pressure responsive main valve for controlling said relief port, a pilot valve responsive to relief port pressure for controlling the movement of the main valve, a valve seat for said pilot valve, said pilot valve having a stem projecting into said chamber, a plunger in said chamber aligned with said stem and extending in end to end relation with said stem, the free end of said plunger extending outwardly of said chamber, and means sealing said plunger to block return port pressure in said chamber from acting on the free end extremity thereof, said plunger having a shoulder thereon, and a spring abutting against said shoulder to hold said plunger and stem together in the said end to end relation.

5. In a valve as set forth in claim 4 wherein said plunger at the location of the sealing thereof is of a diameter equal to the diameter of said valve seat.

6. In a valve as set forth in claim 4 wherein said plunger at the location of the said sealing thereof is of a diameter larger than the diameter of the said valve seat.

7. In a valve as set forth in claim 4 wherein said plunger at the location of the said sealing thereof is of a diameter smaller than the diameter of the valve seat.

References Cited in the file of this patent

UNITED STATES PATENTS

| | | |
|---|---|---|
| 781,913 | Schutte | Feb. 7, 1905 |
| 2,164,669 | Thomas | July 4, 1939 |
| 2,520,893 | Stevenson | Aug. 29, 1950 |
| 2,523,826 | Heinzelman | Sept. 26, 1950 |
| 2,577,999 | Christensen | Dec. 11, 1951 |
| 2,587,161 | Huber | Feb. 26, 1952 |
| 2,597,057 | Berquist | May 20, 1952 |
| 2,601,870 | Lee | July 1, 1952 |